Patented Jan. 4, 1927.

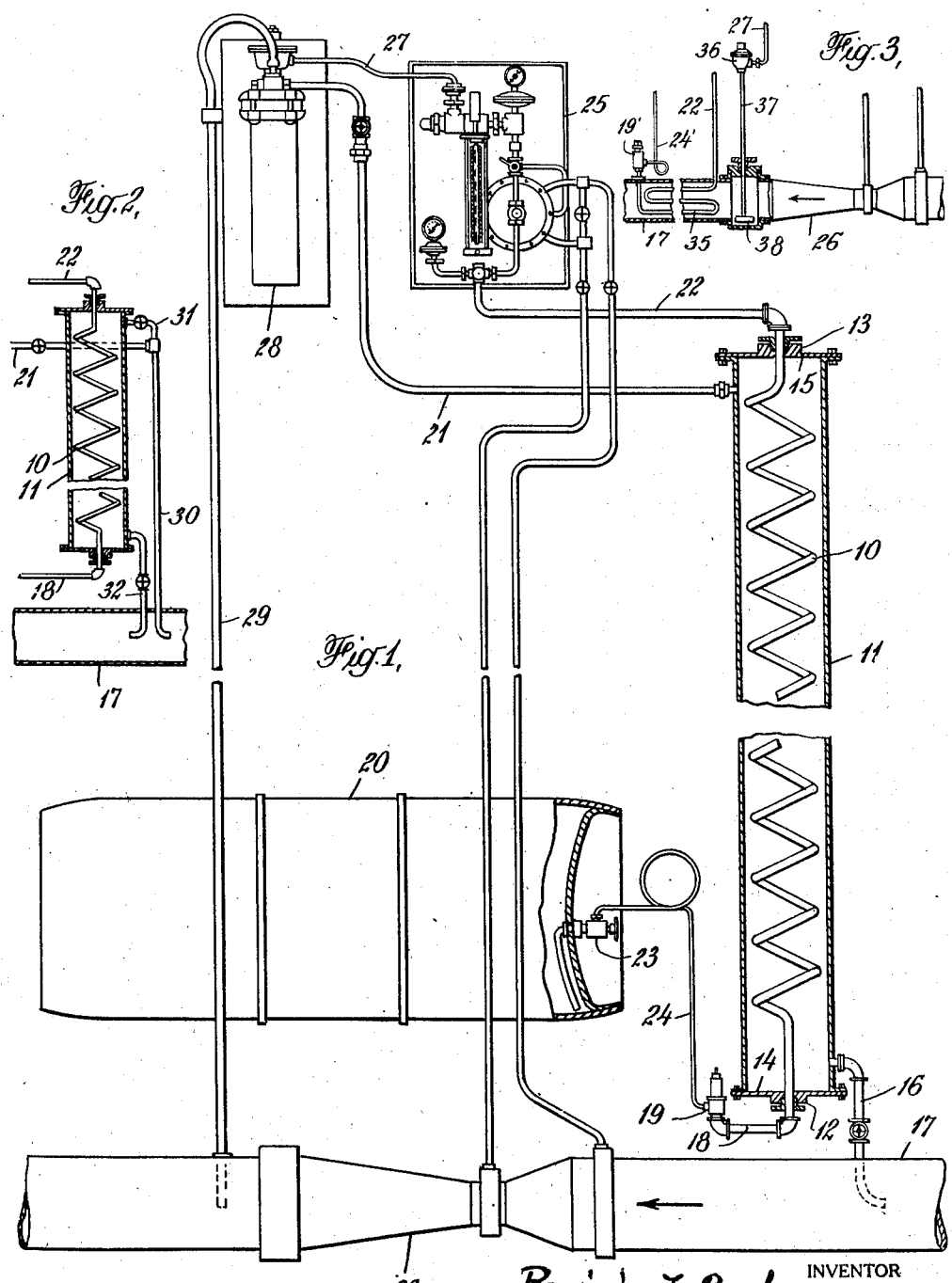

1,613,438

UNITED STATES PATENT OFFICE.

BENJAMIN T. BROOKS, OF SOUND BEACH, CONNECTICUT, ASSIGNOR TO THE MATHIESON ALKALI WORKS, OF NEW YORK, N. Y., A CORPORATION OF VIRGINIA.

CHLORINATION OF WATER.

Application filed March 22, 1924. Serial No. 701,196.

This invention relates to an improved method and apparatus for effecting, with liquid chlorine, regulated chlorination of liquids, particularly flowing streams of water or the like. The invention is particularly adapted for chlorinating domestic water supplies and for the treatment of waste effluents, such as sewage, in the form of aqueous solutions or suspensions, where a relatively small proportion of chlorine is employed. The method of the invention includes evaporation of liquid chlorine by heat interchange with the liquid chlorinated and regulated introduction of the vaporized chlorine into the liquid to be chlorinated. The apparatus of the invention includes means for bringing the liquid chlorine into heat exchanging relation with the liquid chlorinated whereby the chlorine is vaporized, means for introducing the vaporized chlorine into the liquid, and means for regulating the amount of chlorine so introduced.

Chlorine is commonly supplied to the consumer in the form of a liquid in heavy containers under pressure. In chlorinating a flowing stream of liquid with liquid chlorine, it is not feasible to introduce the liquid chlorine directly into the liquid to be chlorinated, due to the difficulty of regulating the amount of chlorine with reference to the amount of liquid to be chlorinated. Regulation of the flow of gaseous chlorine can be satisfactorily accomplished, but where liquid chlorine is employed, such regulation necessitates previous evaporation of the liquid chlorine. Although chlorine has a relatively low boiling point, about $-33.6°$ C. at 750 mm., it has a rather high heat of vaporization, about 67 calories per gram, and it is necessary to supply an appreciable amount of heat to vaporize liquid chlorine, even at reduced pressures. It has hitherto been proposed to permit the liquid chlorine to vaporize in the container in which it is supplied, but this cools off the container so rapidly that the chlorine does not readily continue to vaporize and the supply of gaseous chlorine is correspondingly reduced. To overcome this, it has also been proposed to draw the vaporized chlorine from a plurality of containers at the same time, withdrawing the chlorine gas sufficiently slowly from each of the containers to prevent objectionable cooling, but this involves the use of an excessive number of containers. Where this method is employed, it is not unusual to find as many as forty to fifty cylinders of liquid chlorine connected to a common gas line. It has also been proposed to evaporate the liquid chlorine in a separately heated vaporizer, withdrawing the chlorine from the container as a liquid instead of as a gas, but such methods involve a special operation which consumes fuel and requires the attention of an operator.

The present invention overcomes these and other disadvantages of a similar nature incident to present operations, and provides a simple and economical method and apparatus for effecting regulated chlorination of liquids, particularly flowing liquid streams. According to the present invention, liquid chlorine is evaporated by being brought into heat interchanging relation with the liquid chlorinated and the chlorine gas thus produced is then introduced into the liquid to be chlorinated, regulation of the amount of chlorine gas with reference to the amount of liquid chlorinated being effected by regulation of the flow of chlorine gas after evaporation.

In carrying out the method of the invention in the treatment of flowing liquid streams, the flowing stream of liquid may be brought into heat interchanging relation with the liquid chlorine either before or after it has been subjected to chlorination. By passing the liquid chlorinated in heat exchanging relation with the liquid chlorine after the introduction of the vaporized chlorine, any heat developed by the chlorination reaction also assists in the evaporation of the chlorine. All or a part of the liquid stream chlorinated can be utilized to effect the evaporation. The gaseous chlorine may be directly introduced into the entire stream of liquid or a by-passed part of the stream may be chlorinated and then reintroduced into the remainder.

In chlorinating a flowing stream of water, for example, water for domestic consumption, the amount of chlorine used is usually comparatively small, for example, 2½ lbs. of chlorine per million gallons of water, and, at the temperatures ordinarily encountered, a small proportion of the water treated is sufficient to vaporize all of the chlorine required. In such cases, a part of the water may be by-passed through the vaporizing apparatus, or a part of the water may be chlorinated and this chlorinated water used for treating the rest of the water, and that part of the water which is chlorinated may be that part used to vaporize the liquid chlorine.

The chlorine evaporating receptacle may comprise a simple pipe coil arranged for free escape of vaporized chlorine and disposed within a conduit through which the flowing stream of liquid passes, either ahead of or behind the point where the gaseous chlorine is introduced into the main stream. Where only a part of the flowing liquid stream is employed in vaporizing the liquid chlorine, the evaporation may be effected in a coil disposed within a tank through which a part of the stream is by-passed. Apparatus of the type described in my application filed October 2, 1923, Serial No. 669,904, may be employed to effect the evaporation. Where a part of the flowing stream is chlorinated and reintroduced into the main stream, a separate chlorinating chamber is provided through which a portion of the main stream is by-passed, and connections may be provided for bringing this by-passed proportion into heat exchanging relation with the evaporating receptacle.

The invention will be further described in connection with the accompanying drawings, illustrating apparatus embodying the invention and adapted for practicing the method of the invention, and more particularly with reference to the chlorination of a flowing stream of water. In the drawings:

Fig. 1 is a diagrammatic and partially sectional view in elevation of a chlorinating apparatus according to the present invention, and, Figs. 2 and 3 are fragmentary views showing modified forms of the apparatus of Fig. 1.

The invention is applicable in connection with regulating apparatus of different types, but for convenience it has been illustrated in connection with the Wallace and Tiernan regulator, a well known type. This regulator is described in Patents Nos. 1,283,993 and 1,285,491 and reference is made to these patents for a more complete description of the construction and operation of the type of regulator illustrated. The regulator illustrated is adapted to regulate the flow of chlorine gas therethrough with reference to the amount of liquid passing in the flowing stream substantially independently of variations in surrounding conditions.

The evaporator illustrated in Fig. 1 consists of a coil of pipe 10, disposed within a jacket 11, the pipe coil passing through packed joints 12 and 13 in heads 14 and 15 which are tightly secured to the jacket wall 11. The pipe 10 may be a thin walled steel tube or may be constructed of other material having a sufficiently high heat conductivity which is not attached to a prohibitive degree of chlorine, such as copper, for example. Connection 16 is provided to by-pass through jacket 11 a part of the water flowing through conduit 17, where it passes over the coil 10 in heat exchanging relation therewith. Liquid chlorine is supplied to the coil 10 through connection 18 and expansion valve 19 from drum 20. After passing through the jacket 11, the water by-passed through connection 16 leaves the jacket through conection 21. The vaporized chlorine gas is conducted to the regulating apparatus from the evaporating coil 10 through connection 22.

The drum 20 represents a typical container in which liquid chlorine is supplied to the consumer and consists of a steel drum and a valved connection 23 for withdrawing liquid chlorine therefrom. The liquid chlorine passes from the container through connection 24 to the expansion valve 19.

The regulator 25, in conjunction with the Venturi tube 26, controls the amount of gaseous chlorine passing through connection 27 with respect to the flow of water through the conduit 17. This regulated flow of gaseous chlorine passes into the auxiliary initial chlorinating chamber 28 through connection 27 where it mingles with and is absorbed by the water flowing into the chamber 28 through connection 21. The chlorinated water from the chamber 28 is reintroduced into the stream flowing through conduit 17 after passing through connection 29, the entire stream passing through pipe 17 being chlorinated thereby. In operation, the valve 19 is preferably choked sufficiently to maintain the chlorine liquid up to this valve, where it is expanded into the evaporating coil 10 to a pressure sufficient to force the evaporated chlorine through the control apparatus and chlorinating apparatus and into the flowing stream of water.

Instead of chlorinating that part of the water by-passed through the jacket 11, as shown in Fig. 1, connections may be provided to by-pass part of the water through the jacket 11 and to by-pass a separate part of the water through the chlorinating chamber 28, as shown in Fig. 2. In this modification, chlorine passes to the evaporating coil 10 through connection 18, the evaporated chlorine passing to the control apparatus through connection 22 as shown in Fig. 1. Connection 30 is provided to withdraw a part of the liquid passing through the conduit 17. Part of the water by-passed through connection 30 is passed to the auxiliary chlorinating chamber 28 through connection 21 and part is directed into the jacket of the evaporator 11 through connection 31. After passing over the evaporating coil 10 and in heat interchanging relation therewith, the water passing through the jacket 11 is returned to the conduit 17 through connection 32.

In place of by-passing a portion of the flowing stream of water over the chlorine evaporator, an evaporating coil may be arranged within the conduit through which the flowing stream passes, and the chlorine gas may be introduced directly into the main stream of water instead of introducing the chlorine into part of the water in a separate operation, as illustrated in Fig. 3. In this modification, liquid chlorine, from a container such as 20, passes through connection 24' to the expansion valve 19', and thence to the evaporating coil 35 arranged within the conduit 17 at a point beyond the Venturi tube 26, the evaporated chlorine passing to the control apparatus through connection 22. The regulated stream of chlorine passing from the control apparatus 25 through connection 27 is introduced, through back pressure valve 36, connection 37 and diffuser 38, directly into the stream of water flowing through conduit 17.

It will thus be seen that the present invention provides an improved method and apparatus for chlorinating liquids in which the chlorine is always supplied as a gas and at about the temperature of the liquid to be chlorinated and which is particularly advantageous in effecting regulated chlorination of flowing liquid streams. The invention is particularly applicable to the chlorination of domestic water supplies and waste effluents such as sewage, there being abundant heat in such materials to evaporate the chlorine without chilling the material to an objectionable degree, and where a small proportion of chlorine is employed, the amount of liquid used to vaporize the chlorine can be varied so that only a few degrees decrease in temperature at most takes place and so that all danger of freezing of the liquid can be avoided.

It will also be apparent that the invention in its broad aspect is applicable to the treatment of liquids with regulated amounts of chlorine where the flow of liquid chlorinated is not strictly continuous. For example, the chlorine gas may be introduced in regulated amount into the liquid in a tank or receptacle of relatively large volume and the liquid chlorine evaporated by heat exchange with the liquid chlorinated before or after chlorination in the tank. Flow through the tank may be continuous or intermittent and may be retarded or periodically interrupted to permit more complete absorption or reaction of the chlorine introduced. Regulation of the amount of chlorine with reference to the amount of liquid chlorinated may be effected, for example, by introducing the chlorine into a chlorinating receptacle at a constant rate and holding the liquid chlorinated in the receptacle for a definite time. Such procedure is sometimes advantageous in the treatment of sewage. The invention is also useful in effecting regulated chlorination of other fluids where the fluid is at a temperature above the boiling point of liquid chlorine at a corresponding pressure and contains sufficient available heat to effect evaporation of the chlorine in the proportion in which it is employed.

I claim:

1. A method of chlorinating liquids, which comprises first vaporizing liquid chlorine by passing it in indirect heat exchanging relation with the liquid, then regulating the flow of the vaporized chlorine gas with reference to the amount of liquid chlorinated, and introducing the chlorine gas after regulation into the liquid.

2. A method of chlorinating flowing liquid streams, which comprises first evaporating liquid chlorine by passing it in indirect heat exchanging relation with a part of the flowing liquid stream, then regulating the flow of the vaporized chlorine gas with reference to the flow of liquid, and introducing the chlorine gas into the liquid stream after regulation.

3. A method of chlorinating liquids, which comprises first evaporating liquid chlorine by passing it in indirect heat exchanging relation with the liquid, then regulating the flow of the vaporized chlorine gas with reference to the amount of liquid chlorinated, introducing the chlorine gas after regulation into a part of the liquid, and reintroducing the chlorinated liquid into the main body of liquid.

4. A method of chlorinating flowing liquid streams, which comprises first vaporizing liquid chlorine by passing it in indirect heat exchanging relation with a by-passed part of the liquid stream, then regulating the flow of the vaporized chlorine gas with reference to the flow of liquid, introducing the chlorine gas after regulation into the by-passed part of the liquid, and reintroducing the chlorinated liquid into the main stream.

5. A method of chlorinating flowing liquid streams, which comprises first vaporizing liquid chlorine by passing it in indirect heat interchanging relation with the liquid, then regulating the flow of the vaporized chlorine gas with reference to the flow of liquid, introducing the chlorine gas after regulation into a by-passed part of the liquid stream, and reintroducing the chlorinated liquid into the main stream.

6. A method of chlorinating flowing liquid streams, which comprises first evaporating liquid chlorine by passing it in indirect heat interchanging relation with the flowing stream of liquid, then regulating the flow of the vaporized chlorine gas with reference to the flow of liquid, and introducing the chlorine gas after regulation into the flowing liquid stream after the liquid stream passes in heat exchanging relation with the liquid chlorine.

7. A method of chlorinating flowing streams of water, which comprises first vaporizing liquid chlorine by passing it in indirect heat exchanging relation with the water, then regulating the flow of the vaporized chlorine gas with reference to the flow of water, and introducing the chlorine gas into the stream of water after regulation.

8. A method of chlorinating flowing streams of water, which comprises first vaporizing liquid chlorine by passing it in indirect heat interchanging relation with the water, then regulating the flow of the vaporized chlorine gas with reference to the flow of water, introducing the chlorine gas after chlorination into a by-passed part of the stream of water, and introducing the chlorinated water into the main stream.

9. A method of chlorinating flowing streams of water, which comprises first vaporizing liquid chlorine by passing it in indirect heat exchanging relation with a by-passed part of the water, then regulating the flow of the vaporized chlorine gas with reference to the flow of water and introducing the chlorine gas after chlorination into the stream of water.

10. A method of chlorinating fluids which are at a temperature above the boiling point of liquid chlorine at a pressure corresponding to that of the fluid, which comprises first vaporizing liquid chlorine by passing it in indirect heat exchanging relation with the fluid, then regulating the flow of the vaporized chlorine gas with reference to the amount of fluid chlorinated, and introducing the chlorine gas into the fluid after regulation.

In testimony whereof I affix my signature.

BENJAMIN T. BROOKS.